(12) United States Patent
Babuska et al.

(10) Patent No.: US 9,387,739 B2
(45) Date of Patent: Jul. 12, 2016

(54) ADJUSTABLE DEVICE FOR SUPPORTING HITCH MOUNTED ACCESSORIES

(71) Applicants: Vit Babuska, Albuquerque, NM (US); Emil Valentin Ardelean, Albuquerque, NM (US)

(72) Inventors: Vit Babuska, Albuquerque, NM (US); Emil Valentin Ardelean, Albuquerque, NM (US)

( * ) Notice: Subject to any disclaimer, the term of this patent is extended or adjusted under 35 U.S.C. 154(b) by 0 days.

(21) Appl. No.: 14/141,616

(22) Filed: Dec. 27, 2013

(65) Prior Publication Data

US 2015/0184795 A1  Jul. 2, 2015

(51) Int. Cl.
| | | |
|---|---|---|
| *B60D 1/54* | (2006.01) | |
| *B60R 9/06* | (2006.01) | |
| *B60R 9/10* | (2006.01) | |
| *B60D 1/07* | (2006.01) | |
| *B60D 1/46* | (2006.01) | |
| *B60D 1/52* | (2006.01) | |

(52) U.S. Cl.
CPC .. *B60D 1/54* (2013.01); *B60D 1/07* (2013.01); *B60D 1/46* (2013.01); *B60D 1/52* (2013.01); *B60R 9/06* (2013.01); *B60R 9/10* (2013.01); *B60D 2001/544* (2013.01)

(58) Field of Classification Search
CPC .............. B60R 9/06; B60R 9/08; B60R 9/10; B60R 9/12; B60D 1/481; B60D 1/488; B60D 1/54; B60D 1/544; B60D 2001/544; B60D 1/07; B60D 1/46; B60D 1/52
USPC ................ 280/491.5, 186; 224/518, 519, 520
See application file for complete search history.

(56) References Cited

U.S. PATENT DOCUMENTS

| | | | | |
|---|---|---|---|---|
| 3,794,227 | A * | 2/1974 | Stearns ......................... | 224/532 |
| 5,190,195 | A * | 3/1993 | Fullhart et al. ................ | 224/497 |
| 5,330,084 | A * | 7/1994 | Peters ........................... | 224/506 |
| 5,423,566 | A * | 6/1995 | Warrington et al. ......... | 280/415.1 |
| 5,775,560 | A * | 7/1998 | Zahn ........................ | B60R 9/06 |
| | | | | 224/485 |
| 6,000,594 | A * | 12/1999 | Chimenti ...................... | 224/519 |
| 6,062,451 | A * | 5/2000 | Lassanske et al. ............ | 224/502 |
| 6,129,371 | A * | 10/2000 | Powell ........................ | 280/461.1 |
| 6,588,636 | B1 * | 7/2003 | Young ....................... | B60R 9/06 |
| | | | | 224/220 |
| 7,195,270 | B2 * | 3/2007 | Norquay .................... | 280/491.5 |
| 7,255,362 | B2 * | 8/2007 | Smith ........................ | 280/490.1 |
| 7,673,894 | B2 * | 3/2010 | Bender ..................... | 280/406.1 |
| 7,766,202 | B2 * | 8/2010 | Depot ........................... | 224/504 |
| 7,878,526 | B1 * | 2/2011 | Jantzen ........................ | 280/515 |
| 7,971,895 | B2 * | 7/2011 | Kozuka ........................ | 280/495 |
| 8,079,611 | B2 * | 12/2011 | Schroeder .................. | 280/491.5 |
| 8,166,695 | B2 * | 5/2012 | Pippin .............................. | 42/94 |
| 8,226,106 | B2 * | 7/2012 | Hensley ..................... | 280/490.1 |
| 8,556,144 | B2 * | 10/2013 | Liu ............................. | 224/497 |
| 8,662,522 | B1 * | 3/2014 | Hunt, III .................... | 280/491.5 |
| 8,979,112 | B2 * | 3/2015 | Weipert et al. ............. | 280/491.5 |

* cited by examiner

Primary Examiner — Michael Safavi

(57) ABSTRACT

A hitch device support assembly for securing hitch mounted accessories to a surface for storage or use when not attached to a vehicle hitch. One or more hitch accessory receivers are attached to a support strut by a pin. The pin may be a locking pin for security. The support strut mounts to any surface, preferably a wall or a work bench leg. The position of the hitch accessory receiver assembly relative to the support strut is adjustable by attachment of the hitch accessory receiver assembly through specific holes in the support strut. The hitch accessory receiver assembly can pivot with respect to the support strut. Hitch devices are secured to the hitch accessory receiver assembly by a pin or bolt, which may be a locking pin if security is required.

3 Claims, 6 Drawing Sheets

Basic embodiment of the invention in the horizontal orientation

Basic embodiment of the invention in the vertical orientation

Perspective view of the basic embodiment of the invention for a 1 ¼ inch hitch mount accessory.

Perspective view of the basic embodiment of the invention for a 2 inch hitch mount accessory.

Details of 1 ¼ hitch receiver assembly

Details of 2 inch hitch receiver assembly

Basic embodiment of the invention in the horizontal orientation

Basic embodiment of the invention in the vertical orientation

Alternate embodiment with a channel strut

Embodiment attached to workbench supporting multiple hitch mount accessories

ADJUSTABLE DEVICE FOR SUPPORTING HITCH MOUNTED ACCESSORIES

BACKGROUND OF THE INVENTION

The invention relates generally to trailer hitch receivers and in particular to a hitch receiver assembly that supports one or more accessories and/or hitch devices when they are not mounted to a vehicle hitch receiver.

A vehicle trailer hitch, mounted at the rear of a vehicle, is used to support a wide variety of accessories in addition to being used for its original purpose. A hitch mount accessory is defined herein as any device that has a tongue of suitable dimension that is inserted into the receiver and is thereby supported by the hitch receiver. Examples of common hitch mount accessories are bicycle carriers, ski and snowboard carriers, and cargo carriers.

Bicycles, skis, and other such objects are often stored in garages, along with the carriers used to transport them, where available storage space may be limited. The present invention allows for any hitch mount accessory to be used as intended, or simply stored, when not attached to a vehicle trailer hitch receiver, by attachment to a wall or other appropriate surface.

Any device that has a hitch tongue can be used with the present invention. For example, a hitch receiver bicycle carrier coupled to the present invention can be used to store bicycles in a garage. A second potential use of the present invention is as a support for a bicycle repair stand that has a hitch mount base. A third potential use is as a secure mount to store a camper in a level condition.

U.S. Pat. No. 7,195,270 discloses a frame type receiver support device whose primary use is as a display stand. The placement of the hitch receiver support is fixed relative to the frame support. U.S. Pat. No. 7,661,543 discloses a holding assembly for storage of one or more hitch devices, but the receiver location is not adjustable nor is the device expandable to hold an indefinite number of hitch mount accessories. The present invention is a simple design that allows multiple hitch mount accessories to be stored in two orientations and maximizes the use of commercially available components, which makes it inexpensive to manufacture. The invention enables organized and efficient storage and off-vehicle use of hitch mount accessories and the objects they hold.

SUMMARY

The present invention comprises a support strut for attachment to a wall or any other sturdy surface such as a work bench leg, and a hitch accessory receiver assembly comprising a square tube to which are welded gusset plates. The hitch accessory receiver tube is a tubular member of square cross section with an internal dimension compatible with standard hitch tongues. Standard hitch tongue dimensions are 1¼ inches or 2 inches.

The hitch accessory receiver assembly attaches to the support strut by one pin extending through holes in the gusset plates and the support strut. A hitch mount accessory is secured to the hitch accessory receiver assembly by a hitch pin or bolt extending through the hitch mount accessory and the receiver hitch tube of the invention. The position of the hitch accessory receiver assembly on the support strut is adjustable. This allows for quick adjustment of the height of the hitch assembly once it is attached to a wall or post. For example, varying the height of the hitch receiver makes it convenient to work on a bicycle supported on a repair stand attached to the hitch receiver.

The hitch accessory receiver assembly may be attached in two orientations with respect to the support strut. In the horizontal orientation, the support strut and the hitch accessory receiver assembly comprise a generally L-shape. In the vertical orientation, the hitch accessory receiver assembly comprise a generally U-shape. A second pin, tangent to the support strut, inserted into holes in the gusset plates, maintains the hitch accessory receiver assembly in the vertical orientation. Multiple hitch accessory receiver assemblies may be attached to the support strut.

BRIEF DESCRIPTIONS OF THE DRAWINGS

Figure 6:
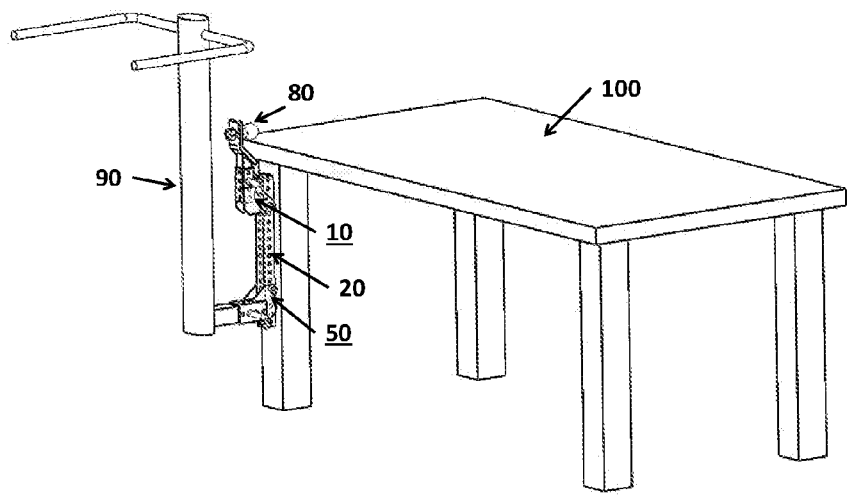

FIG. 6 is a perspective view of an alternate embodiment of the present invention showing two hitch accessory receivers attached to the support strut. One hitch accessory receiver assembly is oriented horizontally and the second is oriented vertically. A hitch accessory is shown inserted in each of the hitch accessory receivers of the present invention.

DESCRIPTION OF EMBODIMENTS

Figure 1:
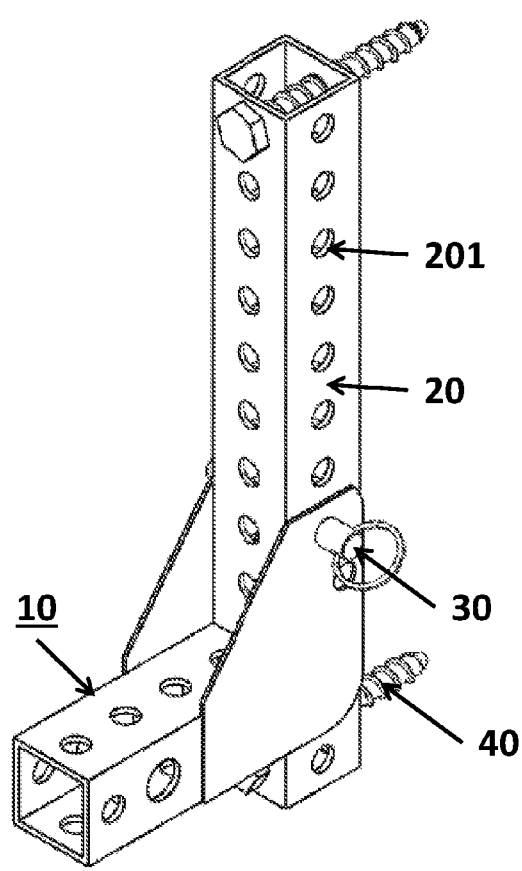
FIG. 1 is a perspective view of the hitch support device according to the basic embodiment of the present invention with a hitch accessory receiver tube sized for a 1¼ inch hitch mount accessory.
Figure 2:
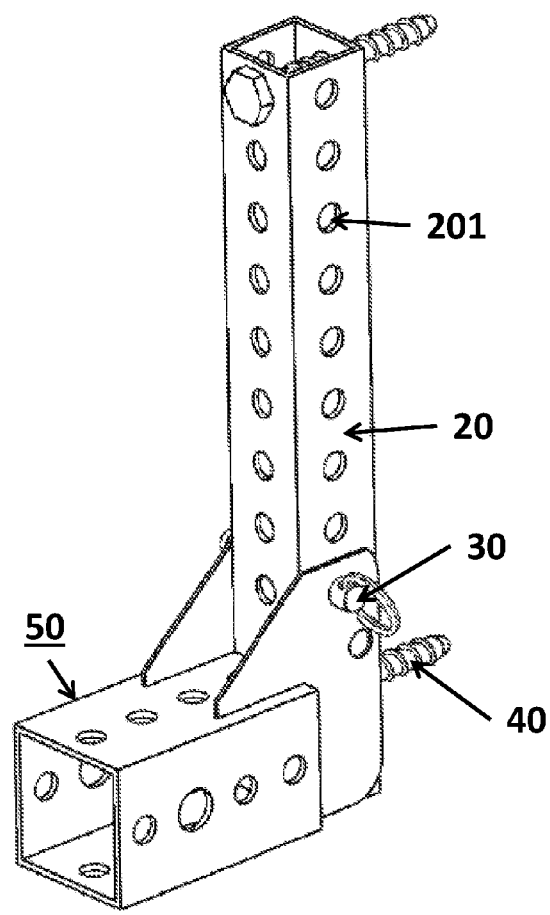
FIG. 2 is a perspective view of another embodiment of the present invention with a hitch accessory receiver tube sized for a 2 inch hitch mount accessory.
Figure 3A:
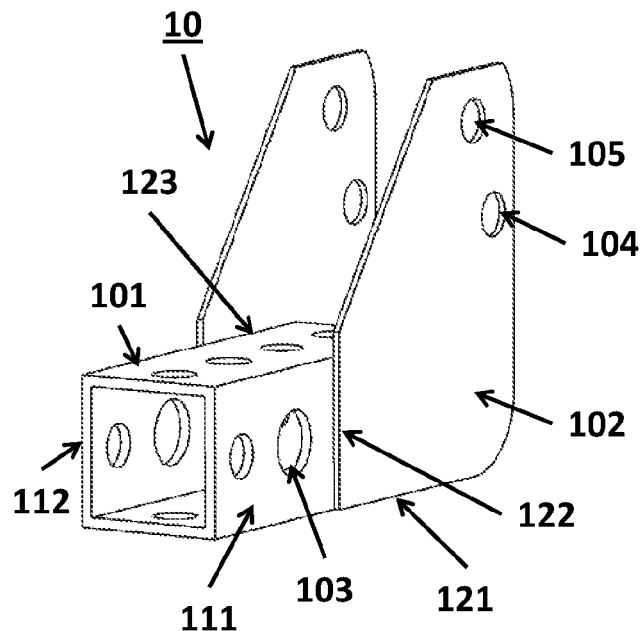
FIG. 3A is a detailed perspective view of the hitch accessory receiver assembly of FIG. 1.
Figure 3B:
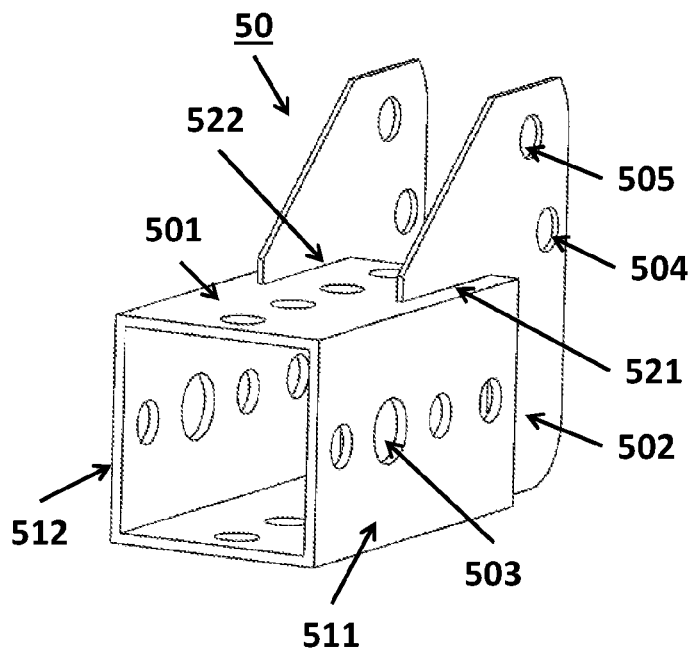
FIG. 3B is a detailed perspective view of the hitch accessory receiver assembly of FIG. 2.

The basic embodiment of the invention is shown in FIG. 1. An alternate embodiment of the invention is shown in FIG. 2. The details of the hitch accessory receiver assembly 10 of FIG. 1 are shown in FIG. 3A. The details of the hitch accessory receiver assembly 50 of FIG. 2 are shown in FIG. 3B.

The basic embodiment of the invention shown in FIG. 1 consists of a support strut 20 and a hitch accessory receiver assembly 10. The support strut 20 comprises a standard perforated tube of rigid material of adequate structural capability to react the loads imparted by the weight of the hitch mount accessory. The invention is to be installed on a sturdy surface such as a wall or work bench leg with bolts 40. The cross-sectional dimension of support strut 20 can be any size, but 1½ inches is the preferred external width so that the dimensions of support strut 20 are consistent with a hitch accessory receiver assembly 10 sized for a 1¼ inch hitch tongue. The hitch accessory receiver assembly 10 attaches to the support strut with pin 30. A locking strut pin may be used for security and theft deterrence. The location of a hitch accessory receiver assembly 10 on support strut 20 can be varied by pinning the hitch accessory receiver assembly to support strut 20 through different holes 201. This allows for positioning and repositioning of the hitch accessory receiver assembly with respect to a reference surface such as the ground.

FIG. 3A shows the details of the hitch accessory receiver assembly 10 in FIG. 1. Holes 103 are of suitable dimension located on sides 111 and 112 of hitch receiver tube 101 through which a hitch pin 60, shown in FIG. 4A, secures the hitch mount accessory to the hitch accessory receiver tube. A locking hitch pin may be used for greater security. Hitch pin 60 may be a hitch bolt if the hole in the hitch accessory is threaded to use a bolt. The length of hitch receiver tube 101 should be consistent with standard 1¼ inch hitch tongue length. Gusset plates 102 are welded along contact edges 121, 122, and 123 to the hitch accessory receiver tube and spaced so that support strut 20 fits between them with a small tolerance gap. Holes 105 in gusset plates 102 align with the holes in support strut 20, so that the hitch accessory receiver assembly attaches to support strut 20 by pin 30, as described previously. The corners of gusset plates 102 are rounded to allow the hitch accessory receiver assembly to pivot around pin 30 without interfering with the surface to which the support strut is attached. Pin 31 inserted through holes 104 restrains the hitch accessory receiver assembly in the vertical orientation, shown in FIG. 4B.

FIG. 2 shows an alternate embodiment of the invention. The difference between this alternate embodiment and the basic embodiment of FIG. 1 is that the hitch accessory receiver assembly 50 is sized so that the 2 inch hitch accessory tongue may be inserted into it. The support strut 20 is the same. As in the basic embodiment of FIG. 1, support strut 20 is fastened to a sturdy surface with bolts 40 and the 2 inch hitch accessory receiver assembly 50 is attached to the support strut with pin 30. A locking strut pin may be used for security and theft deterrence. The location of the hitch accessory receiver assembly 50 on support strut 20 can be varied by pinning the hitch accessory receiver assembly to support strut 20 through different holes 201.

The details of the hitch accessory receiver assembly 50 of the alternate embodiment shown in FIG. 2 are shown in FIG. 3B. Holes 503 are of suitable dimension located on sides 511 and 512 of hitch receiver tube 501 through which a hitch pin 60 secures the hitch mount accessory to the hitch accessory receiver tube. As in the basic embodiment, a locking hitch pin may be used for security and theft deterrence. Hitch pin 60 may instead be a hitch bolt if the hole in the hitch accessory is threaded to use a bolt. The length of hitch receiver tube 501 should be consistent with standard 2 inch hitch tongue length. Gusset plates 502 are welded along contact edges 521 and 522 to hitch accessory receiver tube 501 and spaced so that support strut 20 fits between them with a small tolerance gap. Holes 505 in the gusset plates align with the holes in support strut 20, so that the hitch accessory receiver assembly attaches to support strut 20 by pin 30, as described previously. The corners of gusset plates 502 are rounded to allow the hitch accessory receiver assembly to pivot around pin 30 without interfering with the surface to which the support strut is attached. Pin 31, inserted through holes 504 in gusset plates 502 restrains the hitch accessory receiver assembly in the vertical orientation, as in the basic embodiment.

Figures 4A, 4B:
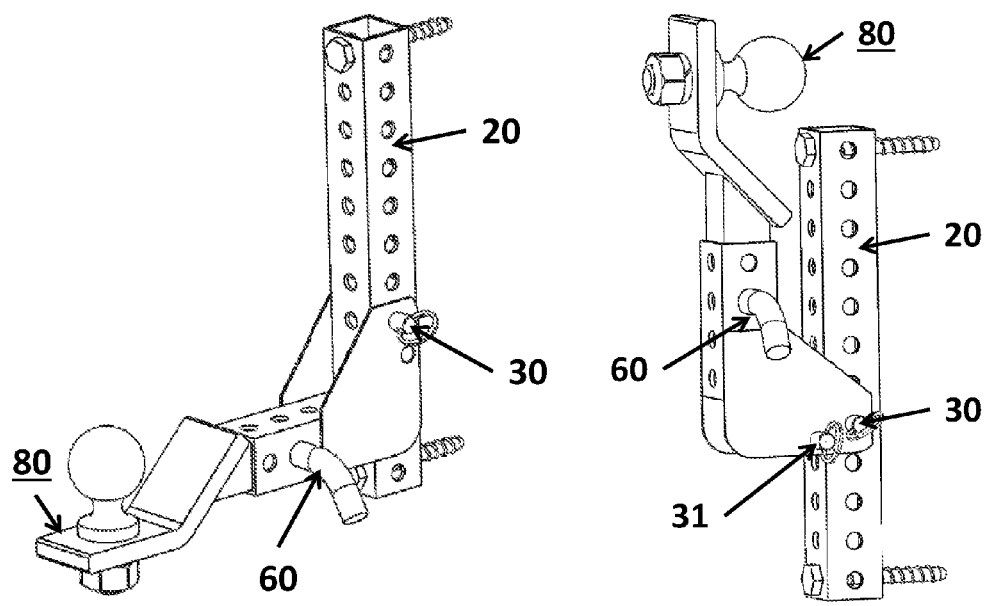
FIG. 4A is a perspective view of the embodiment in FIG. 1 in the horizontal orientation with a hitch accessory inserted in the hitch accessory receiver.
FIG. 4B is a perspective view of the embodiment in FIG. 1 in the vertical orientation with a hitch accessory inserted in the hitch accessory receiver.

The hitch accessory receiver assembly of either embodiment of the invention may be oriented with its longitudinal axis perpendicular to the support strut as shown in FIG. 4A. This is referred to as the horizontal orientation herein. The support strut and the hitch accessory receiver assembly comprise a generally L-shape in the horizontal orientation. Hitch mount accessory 80 extends from the invention allowing it to be used as it would be when attached to a vehicle receiver.

The hitch accessory receiver assembly of either embodiment may be oriented with its longitudinal axis parallel to the support strut as shown in FIG. 4B. This is referred to as the vertical orientation herein. The support strut and the hitch accessory receiver assembly comprise a generally U-shape in the vertical orientation. This orientation allows for space saving storage of small hitch accessories such as the hitch ball insert 80 shown in FIG. 4B.

Figure 5:
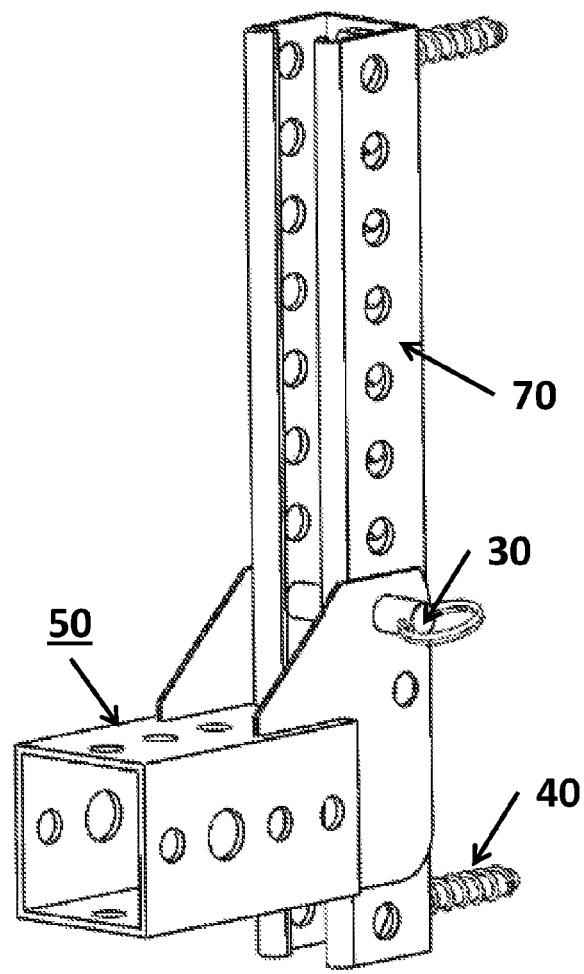
FIG. 5 is a perspective view of an alternate embodiment of the present invention showing a 2 inch hitch accessory receiver assembly and a channel strut support.

An alternate embodiment of the device is shown in FIG. 5 in which the support strut is a channel strut 70. The channel strut has the advantage that bolts 40 do not interfere with the location of pin 30. The disadvantage is that commercially available channel struts generally are not available with holes in the side walls.

FIG. 6 shows an embodiment of the invention with two hitch accessory receiver assemblies attached to support strut 20; however, more hitch accessory receiver assemblies may be attached to the support strut as needed providing that the length of the support strut is sufficient. The positions of the hitch accessory receiver assemblies 10 and 50 on support strut 20 are adjustable by pinning the hitch accessory receiver assemblies through different holes 201 in support strut 20. The bottom hitch accessory receiver assembly 50 is in the horizontal orientation. A hitch mounted bicycle rack 90 is attached to the bottom hitch accessory receiver assembly 50. The top hitch accessory receiver assembly 10 in is in the vertical orientation. The hitch accessory receiver assembly 10 is shown supporting a hitch ball insert 80. The invention is shown with the support strut 20 bolted to a work bench 100 illustrating one potential use of the invention.

The invention claimed is:

1. A hitch device support assembly providing a structural attachment to a surface for any device that can be attached to a vehicle receiver hitch, comprising:
    a. a hitch accessory receiver assembly comprising a receiver tube of suitable dimension and length for mating with the hitch device by inserting a portion of the hitch device, commonly known as the hitch tongue, into the receiver tube; the receiver tube having a hole of appropriate dimension and placement through which a pin or bolt is inserted to secure the hitch device to the receiver tube; the receiver tube having two gusset plates welded to it and spaced to attach the hitch accessory receiver assembly to a support strut by means of a pin extending through holes in the gusset plates and the support strut; the receiver tube being pivotable with respect to a support strut on the pin attaching the hitch accessory receiver assembly to the support strut; the receiver tube being supported in the vertical orientation by a second pin extending through holes in the gusset plates, abutting the support strut;
    b. a support strut capable of supporting the hitch accessory receiver assembly and hitch device at multiple locations on the support strut, capable of being attached to a surface and possessing sufficient structural strength and rigidity to react the loads imparted by the weight of the hitch device through the hitch accessory receiver assembly to the support strut, in which the support strut and the receiver support tube comprise a generally L-shape when the hitch accessory receiver longitudinal axis is perpendicular to the support strut; and in which the support strut and the receiver support tube comprise a generally U-shape when the hitch accessory receiver longitudinal axis is parallel to the support strut.

2. The assembly according to claim 1 in which the hitch accessory receiver assembly position relative to the support strut is adjustable by attachment of the hitch accessory receiver assembly through specific holes in the support strut.

3. The assembly according to claim 1 in which multiple hitch accessory receiver assemblies are attached to the support strut.

\* \* \* \* \*